United States Patent [19]

Masuda et al.

[11] 4,064,111
[45] Dec. 20, 1977

[54] METHOD FOR CONDUCTING A VAPOR-LIQUID CONTACT REACTION SEMI-BATCHWISE

[75] Inventors: Shunji Masuda; Yoshinori Oyama; Hisao Tanaka; Isao Uchigasaki; Takehisa Sasaki, all of Hitachi, Japan

[73] Assignee: Hitachi Chemical Company, Ltd., Tokyo, Japan

[21] Appl. No.: 607,702

[22] Filed: Aug. 25, 1975

[30] Foreign Application Priority Data

Aug. 26, 1974 Japan .................... 49-97062

[51] Int. Cl.² .......................................... C08G 63/22
[52] U.S. Cl. ............... 260/75 M; 260/75 EP; 260/95 R; 526/67; 526/68
[58] Field of Search ........... 260/75 M, 75 EP, 95 R; 526/67, 68

[56] References Cited

U.S. PATENT DOCUMENTS

| | | | |
|---|---|---|---|
| 2,822,350 | 2/1958 | Hayes | 260/75 EP |
| 3,442,868 | 5/1969 | Ogata et al. | 260/75 M |
| 3,787,481 | 1/1974 | Siclari et al. | 260/75 M |
| 3,849,379 | 11/1974 | Jeurissen et al. | 260/75 M |
| 3,954,722 | 5/1976 | Echte et al. | 526/67 |
| 4,012,573 | 3/1977 | Trieschmann et al. | 526/68 |

Primary Examiner—Harold D. Anderson
Assistant Examiner—W. C. Danison, Jr.
Attorney, Agent, or Firm—William J. Daniel

[57] ABSTRACT

A method which comprises drawing a part of the reaction liquid from a reactor for unsaturated polyesters, bringing the drawn liquid into contact and reaction with a gaseous starting material or a liquid starting material capable of being converted into vapor on reaction, for example, an alkylene oxide by means of tubular mixing and recycling this reaction liquid to the reactor thereby preventing increase in pressure of the reactor. An apparatus which comprises a reactor having a confined or open structure, a tubular mixer where a part of the reaction liquid drawn from the reactor is mixed with a gaseous starting material or a liquid starting material capable of being converted into vapor on reaction, which is blown through a nozzle, to cause a vapor-liquid reaction, and a liquid circulation pump for supplying the liquid drawn from the reactor to the tubular mixer and recycling the vapor-liquid reaction product to the reactor.

4 Claims, 3 Drawing Figures

4,064,111

METHOD FOR CONDUCTING A VAPOR-LIQUID CONTACT REACTION SEMI-BATCHWISE

BACKGROUND OF THE INVENTION

The present invention relates to a method for conducting a vapor-liquid contact reaction semi-batchwise wherein a reaction product of good quality is obtained while preventing increase in pressure of the reactor and also to an apparatus for conducting a vapor-liquid contact reaction semi-batchwise.

In the prior art vapor-liquid contact reaction, a gaseous starting material or a liquid starting material capable of being converted into vapor on reaction often forms an azeotrope with the reaction product or a by-product. If the boiling point of such starting material is close to that of the reaction product or by-product, it is difficult in the aspects of facilities and economy to perform the reaction in a process wherein the reaction product or by-product is separated continuously from the reaction system while the gaseous starting material or the liquid starting material capable of being converted into vapor is recovered and used again. For these reasons, the apparatus is modified to a confined system conducted semi-batchwise and the process is carried out in such manner that the reaction product or by-product is taken out or separated after all or almost all of the gaseous starting material or the liquid starting material capable of being converted into vapor on reaction is consumed. However, this process adopting such confined reaction system requires the use of a reactor tolerant to high pressure and thus has the following drawbacks:

1. The reactor has to be equipped in total with high safeguard facilities.
2. The expense for the facilities is considerable.

As a result of many researches made for overcoming the above drawbacks, it has now been found that the drawbacks in the prior art processes can be overcome by drawing a part of the reaction liquid from the reactor, bringing the drawn liquid into contact and reaction with a gaseous starting material or a liquid reaction material capable of being converted into vapor on reaction by means of pipe-line mixing and recycling this reaction liquid to the reactor. The present invention has been accomplished on the basis of the above finding.

BRIEF SUMMARY OF THE INVENTION

Accordingly, it is an object of the present invention to provide a method for conducting a vapor-liquid contact reaction semi-batchwise which comprises drawing a part of the reaction liquid from the reactor by means of a liquid-circulation pump, bringing the drawn liquid into contact and reaction with a gaseous starting material or a liquid starting material capable of being converted into vapor at the time of reaction by means of tubular mixing and then recycling this reaction liquid to the reactor.

It is another object of the present invention to provide an apparatus for conducting a vapor-liquid contact reaction semi-batchwise which comprises a reactor equipped with a stirrer and a jacket for effecting both heating and cooling, a tubular mixer where a part of the reaction liquid drawn from the reactor is brought into contact with a gaseous starting material or a liquid starting material capable of being converted into vapor to effect a vapor-liquid reaction, and a liquid-circulation pump for supplying the liquid drawn from the reactor to the tubular mixer and for recycling the vapor-liquid reaction product to the reactor.

It is still another object of the present invention to provide a method for lowering the pressure of the reactor in the method for conducting a vapor-liquid contact reaction semi-batchwise, wherein a part of the reaction liquid is drawn from the reactor and brought into contact and reaction with a gaseous starting material or a liquid starting material capable of being converted into vapor on reaction and then this reaction product is recycled to the reactor.

It is further object of the present invention to provide an improvement in the method for conducting a vapor-liquid contact reaction semi-batchwise wherein the reaction product with a good quality is obtained.

It is still further object of the present invention to provide an improved apparatus for conducting a vapor-liquid contact reaction semi-batchwise wherein a device is made to lower the pressure of the reactor.

BRIEF DESCRIPTION OF THE DRAWINGS

Other and further objects, features and advantages of the present invention will be apparent from the following description taken in connection with the accompanying drawings, wherein.

DETAILED DESCRIPTION OF THE INVENTION

Figure 1:
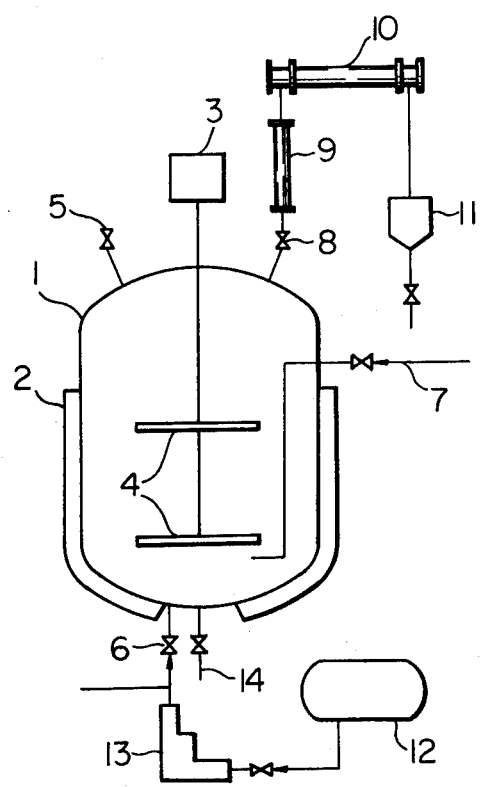
FIG. 1 is a diagram showing a conventional prior art apparatus for conducting a vapor-liquid contact reaction semi-batchwise.

In FIG. 1 showing a conventional prior art apparatus for conducting a vapor-liquid contact reaction semi-batchwise where the vapor-liquid contact reaction is carried out directly in the reactor, 1 is a confined reactor, 2 is a jacket for heating or cooling, 3 is a stirrer, 4 is blades thereof, 5 is an inlet for a starting material and 6 is an inlet for a gaseous starting material or a liquid starting material capable of being converted into vapor at the time of reaction. A starting material which is liquid at the time of reaction is introduced into the reactor 1 through the inlet 5 while a gaseous starting material or a liquid starting material capable of being converted into vapor at the time of reaction through the inlet 6. Both starting materials are brought into contact and reaction in the reactor 1 while stirring the starting materials with the blades 4. 7 is a gas inlet for a gas such as nitrogen to be supplied at need and 8, 9, 10 and 11 are an outlet, a partial condenser, a total condenser and a liquid receiver, respectively, arranged in serial. 12 is reservoir for the gaseous starting material or the liquid starting material capable of being converted into vapor on reaction, 13 is a metering pump for supplying the starting material into the confined reactor 1 through the inlet 6 and 14 is a vent for the reaction product.

Figure 2:
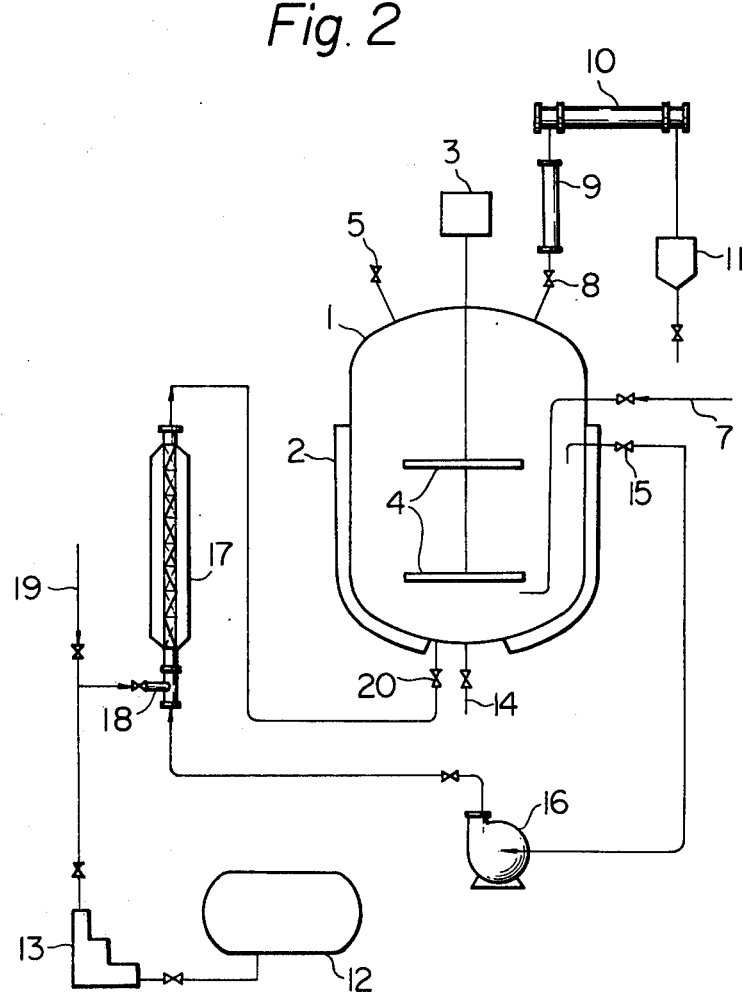
FIG. 2 is a diagram showing the state of pipe-line connection in one preferable embodiment of the present invention.

In FIG. 2 showing a preferable embodiment of the present invention, a part of the reaction liquid is drawn from a reactor 1 through an outlet 15 and conveyed by means of a liquid-circulation pump 16 to a tubular mixer 17 vertically arranged where a gaseous starting material or a liquid material capable of being converted into vapor on reaction conveyed by means of a metering pump 13 is added at the introductory part to the drawn liquid through a nozzle 18. In the interior space of the mixer 17, the drawn liquid and the gaseous or liquid starting material is mixed whereby a vapor-liquid contact reaction is carried out. If necessary, a gas conduit 19 is connected to the pipe line extending to the nozzle 18 so that a gas such as nitrogen may be blown into the reaction system at need, the reaction liquid obtained by the preliminary reaction in the tubular mixer 17 is discharged from the top thereof and recycled to the reactor 1 through an inlet 20 for the recycling liquid. In FIG. 2, the numeral symbols other than those particularly referred to above correspond to the same numeral symbols as given in FIG. 1 and designate the same things.

Figure 3:
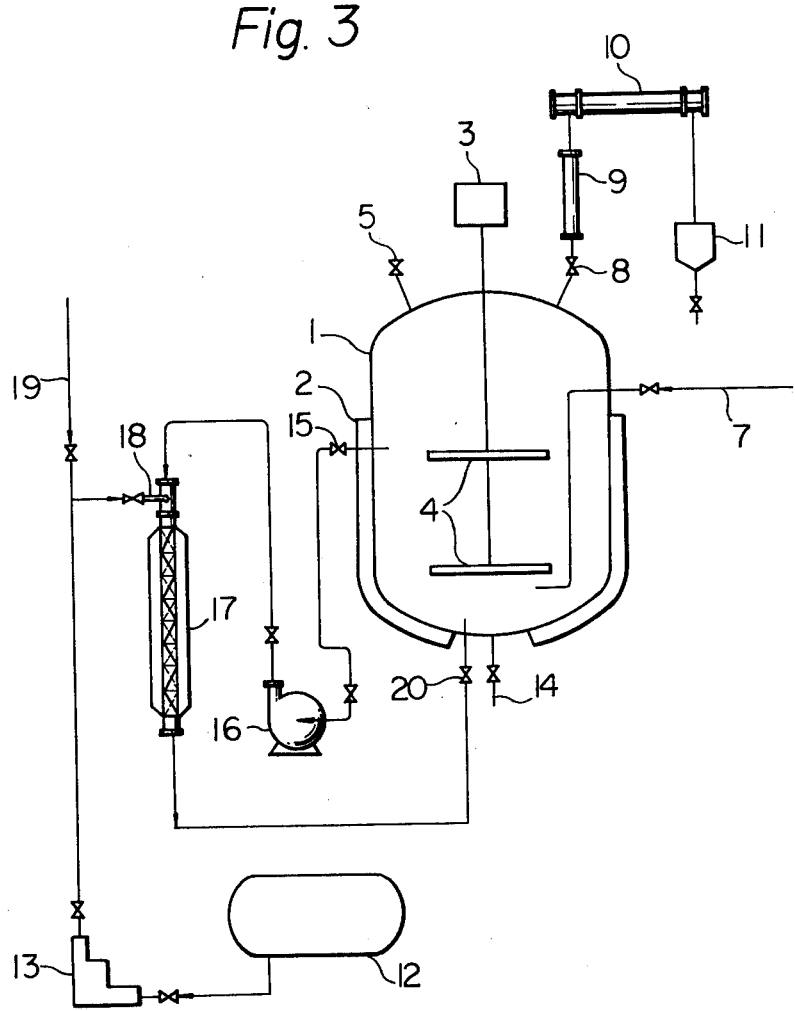
FIG. 3 is a diagram showing the state of pipe-line conection in another embodiment of the present invention.

In FIG. 3 showing another embodiment of the present invention, a part of the reaction liquid is drawn from the reactor 1 through an outlet 15 by means of a liquid-circulation pump 16, introduced into the top portion of a tubular mixer 17 situated vertically, then discharged from the bottom thereof and finally recycled to the reactor 1 through an inlet 20 for the recycling liquid provided at the bottom of the reactor. Except the above mentioned modification, the construction FIG. 3 is similar to that of FIG. 2. According to this construction, the inner pressure of the reactor 1 tends to become lower than the case in FIG. 2. As further variant of the embodiment of the present invention, a part of the gaseous or liquid starting material may directly be introduced into the reactor although this variant is not shown in the drawings.

The pressure resistance of the reactor of the present invention varies according to the sort of starting materials used and the size of the reactor. It is economically preferred, however, that the pressure resistance of the reactor is ½ - 1/10 lower than that of the conventional reactor. The apparatus of the present invention including the reactor may be constructed as an open system to conduct the method under atmospheric pressure. The shape of the blades mounted to the shaft of the stirrer may preferably be conventional ones. The outlet through which a part of the reaction liquid is drawn out may be located in any place of the reactor, especially near the liquid level unless the outlet is close to the inlet for the recycling liquid provided at the bottom of the reactor. The gas conduits are necessary only if the air in the reactor is replaced by a different gas. In such case, the replacement may be effected with either one of the conduits 7 and 19.

The term "tubular mixer" is used herein to mean a mixer with a tube, i.e. an equipment where the reactants are mixed while passing through the tube. Examples of the tubular mixer include a static mixer, honeycomb mixer, square mixer and a tube packed with a filler. The tubular mixer may be in a vertical or horizontal form but the vertical one is desirable. If necessary, the whole reaction zone from the outlet through which a part of the reaction liquid is drawn out to the inlet for the recycling liquid, including the tubular mixer, may be furnished with a lagging material or suitable temperature-keeping facilities.

In the present invention, the amount of the reaction liquid partially drawn from the reactor varies according to the sort of reaction. In general, however, the amount of the reaction liquid is 30 - 1800% per hour based on the total amount of the reaction liquid. Thus, a pumping capacity in proportion of the amount of the recycling liquid is required for the liquid circulation pump. The temperature of the reaction system, the feed rate of a gaseous starting material or a liquid starting material capable of being converted into vapor, and the amount of recycling liquid vary according to the sort of reaction. For example, a temperature of 140° - 240°C, a feed rate of an alkylene oxide within a range of 10 - 100 mol %/hour and an amount of recycling liquid exceeding 5 times of the feed rate (amount) are suitable for the undermentioned reaction for producing unsaturated polyester.

In the present invention, the inner pressure of the reactor may also be controlled by adjusting the amount of the reaction liquid drawn out and the amount of the gaseous or liquid starting material used. In the present invention, the liquid starting material capable of being converted into vapor on reaction may be a mixture of the vapor phase and the liquid phase materials at the time of reaction.

The present invention can be applied to any type of the vapor-liquid reactions where a liquid starting material and a gaseous starting material or a liquid starting material capable of being converted into vapor on reaction are brought into contact and reaction. Illustrative of such vapor-liquid reaction are, for example, the polycondensation reaction between terephthalic acid and ethylene oxide dissolved in a solvent such as acetone, and the addition polymerization reaction between dicyclopentadiene and butadiene.

To further illustrate this invention, and not by way of limitation, the following example is given.

EXAMPLE

Using glycol as initiator and zinc naphthenate as catalyst, an unsaturated polyester was synthetized in the following manner from an acid anhydride, an unsaturated acid anhydride and an alkylene oxide, especially propylene oxide.

An apparatus shown in FIG. 2 was used in this example. A reactor 1 having a capacity of 10 liters and a pressure resistance value of 25 kg/cm² and equipped with a stirrer 3 having two turbin-type stirring blades 4 having an outer diameter equal to ⅓ of the inner diameter of the reactor, a jacket 2 for both heating and cooling purposes, and a nitrogen conduit 7 was charged with a 2.94 kg of maleic anhydride, 4.44 kg of phthalic anhydride, 0.37 kg of ethylene glycol and 5 g of zinc naphthenate through an inlet 5 for the starting materials. After the reactor was confined, an outlet 8 was opened and nitrogen was blown into the reactor through the conduit 7 to replace the air in the reactor with the nitrogen. Steam was passed through the heating or cooling jacket 2 to elevate the temperature of the reactor. After the starting materials had been dissolved, the stirrer 3 was driven to stir the mixture. When the temperature of the reaction liquid reached 140° C, the conduit 7 and the outlet 8 were closed. An outlet 15 from which the reaction liquid was drawn and an inlet 20 for the recycling liquid were opened, the reaction liquid was recycled at a flow rate of 1 kg/min. by means of a liquid-circulation pump 16 in a circuit including a tubular mixer 16 (static mixer).

Valves amounted to pipes from an alkylene oxide reservoir 12 and from a pump 13 for feeding a definite amount of an alkylene oxide were then opened and 2.9 kg of propylene oxide was introduced at a blowing rate of 87 g/min. into the reactor through a blowing nozzle 18 over a period of about 35 minutes. The reaction was continued for 10 minutes and unreacted materials and the gaseous component were taken out by passing the reaction mixture through a partial condenser 9 and a total condenser 10. The desired unsaturated polyester was obtained in a yield of 99 % and had an acid value of 30. In this method, the maximum reaction pressure in the reactor 1 was recorded as 0.8 kg/cm². The reaction was carried out under the same conditions using the same apparatus as described above except that the reactor 1 was not confined. In this case, the yield and acid value of the resulting unsaturated polyester were almost equal to those obtained in the case of using the confined reactor. For the purpose of comparison, the reaction was carried out in the confined system using the conventional apparatus as shown in FIG. 1 where the pump 13 was directly connected to the inlet 20 for the recycling liquid. In this reaction, the proportion of the reactants and the blowing rate of propylene oxide were same as described above. The maximum reaction pressure in the reactor in this case was as high as 5 kg/cm², thus showing superiority of the method and apparatus of the present invention. This comparative test was also carried out in the open system using the same apparatus under the same conditions as described above. In this case, the resulting unsaturated polyester had an acid value of 150 and was utterly unsuited for the practical use. This result obviously shows that the method and the apparatus of the present invention are excellent.

As many apparently widely different embodiments of the present invention may be made without departing from the spirit and scope thereof, it is to be understood that the invention is not limited to the specific embodiments thereof except as defined in the appended claims.

What is claimed is:

1. In a method of preparing a synthetic organic polymer by the polymerization under pressure of polymer-forming reactants, at least one of which is normally in gaseous form or is converted into gaseous form for said polymerization, in which the reactants are supplied to a reactor for semi-batchwise reaction, the improvement comprises withdrawing from said reactor a portion of the reaction liquid and mixing said withdrawn portion by means of a tubular mixer with said one reactant while the latter is in gaseous form and before its introduction into the reactor to effect liquid-vapor contact and initiate preliminary reaction therebetween, and delivering the product of said preliminary reaction to said reactor, whereby the pressure in said reactor can be reduced.

2. A method according to claim 1 wherein said reaction liquid is drawn out in an amount of 30 – 1800 % per hour based on the total amount of said reaction liquid and recycled.

3. A method for producing an unsaturated polyester according to claim 1 wherein said gaseous reactant is an alkylene oxide selected from the group consisting of ethylene oxide and propylene oxide and said liquid starting material is selected from the group consisting of maleic acid, phthalic acid and acid anhydrides thereof.

4. A method according to claim 3 wherein said alkylene oxide is contacted by said tubular mixer in an amount of 10 – 100 mol %/hour is brought at 140 – 240° C with said reaction liquid portion drawn from said reactor in an amount of at least 5 times as much as said alkylene oxide.

* * * * *